United States Patent [19]

Hubbuch et al.

[11] 3,710,573

[45] Jan. 16, 1973

[54] HYDRAZINE MONOPROPELLANT PROCESS USING A GAS GENERATING BED

[75] Inventors: Theodore N. Hubbuch, Florence; James A. Murfree, Jr.; William A. Duncan, both of Huntsville; Billy J. Sandlin, Athens; Henry A. Nappier, Lacey's Spring, all of Ala.

[73] Assignee: The United States of America as represented by the Secretary of the Army

[22] Filed: July 5, 1967

[21] Appl. No.: 651,324

[52] U.S. Cl. .................60/218, 60/219, 60/220, 149/1, 149/36, 149/74
[51] Int. Cl. ..........................C06d 5/08, C06d 5/10
[58] Field of Search ....149/1, 2, 36, 74; 60/218, 219, 60/220

[56] References Cited

UNITED STATES PATENTS

| 3,049,454 | 8/1962 | Stark | 149/2 |
|---|---|---|---|
| 3,191,535 | 6/1965 | Mulloy | 102/99 |
| 3,206,341 | 9/1965 | Reynaud et al. | 149/2 |
| 3,212,255 | 10/1965 | Putt et al. | 60/218 |
| 2,925,709 | 2/1960 | Mantell et al. | 149/36 X |
| 3,021,667 | 2/1962 | Griffin | 149/36 X |
| 3,116,187 | 12/1963 | Scanlon et al. | 149/36 X |
| 3,167,908 | 2/1965 | Dale | 149/36 X |

*Primary Examiner*—Benjamin R. Padgett
*Attorney*—Harry M. Saragovitz, Edward J. Kelly, Herbert Berl and Elihu L. Turetsky

[57] ABSTRACT

An adsorbent such as activated charcoal after adsorbing a fluid such as dinitrogen tetroxide and placed into contact with a reactive, exothermally decomposing monopropellant such as hydrazine, generates sufficient heat to maintain the exothermal decomposition of the monopropellant.

4 Claims, No Drawings

HYDRAZINE MONOPROPELLANT PROCESS USING A GAS GENERATING BED

BACKGROUND OF THE INVENTION

This invention relates to gas generation and in particular to gas generation with liquid monopropellant systems.

There is considerable interest in the rocket propulsion industry in the development and use of liquid monopropellant gas generators. Although the majority of attention has been given to catalytic decomposition schemes, considerable recent interest has been shown in "one-shot" schemes of gas generation utilizing a liquid monopropellant with an initiator and inert bed or support. In these schemes of gas generation, the monopropellant, which decomposes exothermally, reacts with the initiator to start decomposition, generate heat, and heat the support which, when heated, thermally sustains the decomposition.

SUMMARY OF THE INVENTION

This invention involves the use of a suitable adsorbing material as a chemi-thermal bed for the decomposition of exothermally decomposing monopropellants. In accordance with this invention, I have discovered that adsorbents such as activated charcoal of suitable size or mesh, activated alumina, and silica gel will adsorb various compounds which are gases at 25° C, such as dinitrogen tetroxide and chlorine, and which react vigorously with certain monopropellants such as hydrazine and hydrazine-type fuels (e.g., 1,1-dimethylhydrazine and monomethylhydrazine). These adsorbents will also adsorb vapors of volatile liquids such as phosphorous oxychloride and free liquids such as liquid dinitrogen tetroxide.

DESCRIPTION OF THE PREFERRED EMBODIMENTS:

When placed in contact with a reactive, exothermally decomposing monopropellant, the active adsorbed material (adsorbate) on the adsorbent reacts with the monopropellant to generate heat which raises the temperature of the adsorbent or carrier (e.g., activated charcoal) sufficiently to maintain the exothermal decomposition of the monopropellant even after the adsorbate has been consumed. Thus, the adsorbent serves as a thermal bed to maintain monopropellant decomposition for gas generation, and the adsorbate acts as an initiator by reacting with the monopropellant to start decomposition and to heat the bed. In other words, the adsorbate acts as an initiator and the adsorbent acts as a carrier.

The following specific example of this invention is merely intended to be illustrative thereof, and no limitations on the scope of this invention are to be inferred therefrom.

Activated cocoanut charcoal (6–16 mesh) was exposed to a dinitrogen tetroxide atmosphere. It adsorbed the dinitrogen tetroxide to a degree such that the final weight of material represented a mixture of about 30 percent dinitrogen tetroxide and about 70 percent charcoal. Alternatively, the material may be prepared by heating the activated charcoal to 300° C and vacuum pumping. Without exposure to the air, the charcoal is cooled to ambient temperature and then exposed to a dinitrogen tetroxide atmosphere. Again, the total weight of material represents a loading of 30 or more percent dinitrogen tetroxide. When, 1,1-dimethylhydrazine was brought into contact with this dinitrogen tetroxide-charcoal material, a rapid and vigorous reaction occurred and the 1,1-dimethylhydrazine was ignited. After all flame had disappeared and the dinitrogen tetroxide had been consumed, the charcoal was still hot enough to ignite subsequent additions of 1,1-dimethylhydrazine.

Thus, the monopropellant must be an exothermally decomposing type so that when decomposed, it liberates heat which raises the temperature of the adsorbent or bed such that the exothermal decomposition of the monopropellant is maintained thermally.

Various other modifications and variations of this invention will be readily apparent to those skilled in the art in the light of the above teachings, which modifications and variations are within the spirit and scope of this invention.

We claim:

1. The process of gas generation comprising; bringing an exothermally decomposing monopropellant selected from the group consisting of hydrazine, monomethylhydrazine and 1,1-dimethylhydrazine into contact with an adsorbent which contains therein a compound consisting essentially of dinitrogen tetroxide, chlorine or phosphorous oxychloride to cause said compound and said monopropellant to react with the liberation of heat and gas and thereby heat said adsorbent to a temperature sufficient to maintain decomposition of said monopropellant after said compound is expended, said adsorbent being selected from the group comprising activated charcoal, silicia gel and activated alumina.

2. The process of claim 1 wherein said monopropellant is 1,1-dimethylhydrazine, said adsorbent is activated charcoal, and said compound is dinitrogen tetroxide.

3. The process of claim 8 wherein said dinitrogen tetroxide constitutes about 30 percent by weight of the total weight of the composition of said activated charcoal and said dinitrogen tetroxide.

4. The process of claim 1 wherein the composition of said adsorbent and said compound contains 30 percent by weight of said compound.

* * * * *